United States Defensive Publication [19] (H) [11] T975,004

Hansen et al. [43] Oct. 3, 1978

[54] OIL-FREE, PRESSURE SENSITIVE ADHESIVE

[75] Inventors: David R. Hansen; George T. Coker, Jr., both of Houston, Tex.

[73] Assignee: Shell Oil Company

[21] Appl. No.: 873,819

[22] Filed: Jan. 31, 1978

[51] Int. Cl.[2] ..... C08L 45/00

[52] U.S. Cl. ..... 260/829; 260/876 B

[57] ABSTRACT

An oil-free, pressure sensitive adhesive composition comprises a monoalkenyl arene/isoprene block copolymer, a tackifying resin compatible with the isoprene block and a predominately aromatic second resin compatible with the monoalkenyl arene block. These adhesive compositions possess excellent adhesive properties along with a lower melt viscosity and lower cost.

6 Claims, No Sheets Drawing,

9 Pages Specification

The file of this unexamined application may be inspected and copies thereof may be purchased (849 O.G. 1221, Apr. 9, 1968).